(No Model.)
R. R. TAYLOR.
CONDUIT FOR ELECTRIC WIRES.
No. 332,761. Patented Dec. 22, 1885.
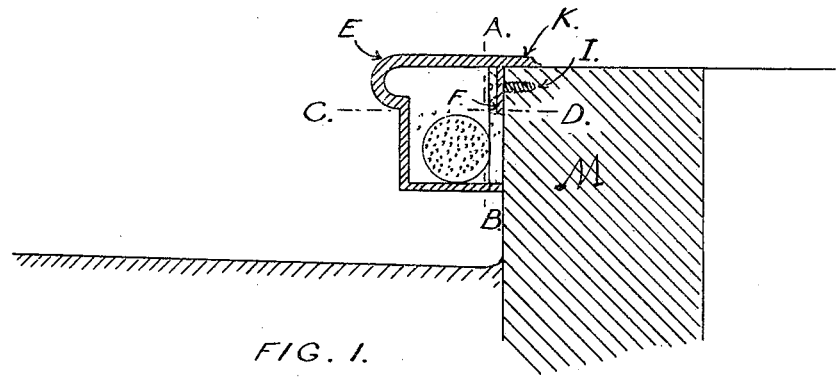
FIG. 1.
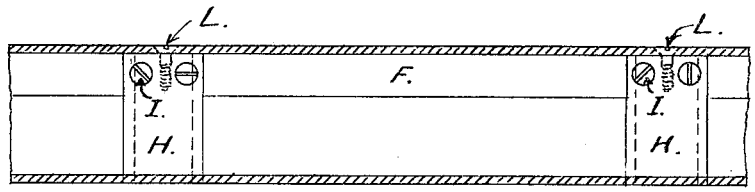
FIG. 2. (SECTION A. B.)
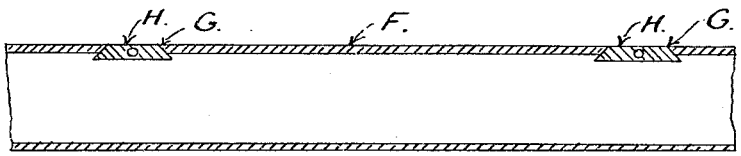
FIG. 3. (SECTION C. D.)
Witnesses.
W. H. Bailey
A. B. Kelly
Inventor.
Robert Robertson Taylor

United States Patent Office.

ROBERT ROBERTSON TAYLOR, OF WASHINGTON, DISTRICT OF COLUMBIA.

CONDUIT FOR ELECTRIC WIRES.

SPECIFICATION forming part of Letters Patent No. 332,761, dated December 22, 1885.

Application filed July 29, 1885. Serial No. 173,007. (No model.)

*To all whom it may concern:*

Be it known that I, ROBERT ROBERTSON TAYLOR, a citizen of the United States, residing at Washington city, in the District of Columbia, have invented new and useful Improvements in Conduits for Electric-Light, Telegraph, Telephone, and other Wires, of which the following is a specification, reference being had to the accompanying drawings, in which—

Figure 1 is a vertical transverse section. Fig. 2 is a longitudinal section on the line A B of Fig. 1, and Fig. 3 a similar section on the line C D.

In the drawings, E indicates a casing of metal or other suitable material. This casing is made in suitable lengths, and is preferably of the form shown in the drawings, though other configurations may be adopted, if desired. This casing has three sides—a bottom, front, and top—the back being formed by the curb or other structure to which it is applied. Depending from the top of the casing is a flange, F, which is designed to bear directly against the front side of curb M, as shown. This flange steadies the conduit in position, and is provided with dovetailed slots G, which engage with certain dovetailed pieces which are more fully described hereinafter.

The top of the conduit is somewhat wider than the bottom, the rearwardly-extending portion forming a flange, K, which bears upon the top of the curb, and prevents the conduit from being displaced by downward pressure. The bottom of the conduit is of such width as to abut against the front side of curb when the conduit is in position. Secured to the front side of the curb are dovetailed pieces H, preferably of the form known as "diminished dovetails." These dovetailed pieces have their smaller ends upward, though this is not necessary, as their position might be reversed; nor is it necessary that diminished dovetails be used. These pieces may be attached to the curb in any suitable manner. I have shown them as attached by means of screws I; but any other means of attaching them may be used.

The conduit is attached to the curb in the following manner: A suitable number of pieces, H, such as described, having been attached to the front side of the curb, a length of conduit is taken, and the slots G in the flange F are slid down on the pieces H in an obvious manner, the bottom of the conduit abutting against the curb. For more securely and firmly attaching the conduit-lengths to the curb, screws L, which pass through the projection K in top of the curb, may be used; but these screws are not absolutely necessary.

The dovetailed pieces may be made of sufficient length to engage with slots in the edge of the bottom of the conduit, similar to those in flange F, whereby a still firmer attachment may be secured; but this also is not absolutely necessary.

While I have described the dovetailed pieces and their engaging slots as a part of my invention, I would have it understood that I do not confine myself to their use, as I may omit them altogether and attach the conduit-lengths to the curb by means of the projection K and the screws passing therethrough.

I may use in place of the dovetailed pieces and their engaging-slots any other suitable attaching means.

While I have shown a conduit substantially rectangular in form—that is, having the top and bottom substantially at right angles to the front side—I do not wish to be understood as confining myself to that form, as I may make different forms. For instance, my conduit may be hemispherical in form, or substantially so. Neither do I confine myself to attaching the conduit to a curb, as I may attach it to any other suitable permanent structure—such, for instance, as a fence or the front wall of a building.

The lengths of conduit are joined together in any suitable manner, and the joint between the lengths may be made water-tight.

Having now described my invention, what I claim, and desire to secure by Letters Patent, is—

1. In combination with a street-curb or other permanent structure, a conduit having an open back, the curb forming the back thereof, and means for securing the conduit and curb together, consisting of a projection or flange resting upon the top of the curb, and screws passing through the same into the curb, as described.

2. In combination with a street-curb or other permanent structure, a conduit having an open back, the curb forming the back thereof, said conduit having a flange bearing against the front side of curb for steadying the conduit in position, and means, substantially as described, for securing the conduit to the curb, consisting of a flange or projection bearing upon the top of the curb, and screws passing through the flange into the curb.

3. In combination with a street-curb or other permanent structure, a conduit having an open back, the curb forming the back thereof, a flange bearing upon the top of the curb, and a dovetailed connection for securing the conduit to the curb, as set forth.

4. In combination with a street-curb or other permanent structure, a conduit having an open back, the curb forming the back thereof, said conduit having a flange bearing against the front part of the curb and having dovetailed slots, dovetailed pieces suitably attached to the curb and engaging said slots, and means for sustaining the conduit from displacement in a downward direction, as set forth.

5. In combination with a street-curb, a conduit having an open back, the curb forming the back thereof, said conduit having a flange bearing upon the front of the curb and provided with a dovetailed slot, and dovetailed pieces suitably secured to the front of the curb, and a projecting flange bearing upon the top of the curb, as set forth.

6. In combination with a street-curb, a conduit having an open back, the curb forming the back thereof, said conduit having a flange bearing upon the front of the curb and provided with a dovetailed slot, dovetailed pieces suitably secured to the front of the curb, a projecting flange bearing upon the top of the curb, and screws passing through the flange into the curb, as set forth.

7. As a new article of manufacture, a conduit having an open back and designed to be applied to a curb or other permanent structure, so that the structure may form the back thereof, a flange for resting upon the top of said structure, and a second flange for bearing against the front of the same, as set forth.

8. As a new article of manufacture, a conduit having an open back and designed to be applied to a street-curb or other permanent structure, so that the structure may form the back thereof, a flange for resting upon the top of said structure, and a second flange for bearing against the front of same, the said conduit having a dovetailed slot for engaging with a dovetailed projection upon the structure to which it is applied, as set forth.

ROBERT ROBERTSON TAYLOR.

Witnesses:
W. H. BAILEY,
A. B. KELLY.